No. 671,681. Patented Apr. 9, 1901.
T. G. SAXTON.
METALLIC ROD PACKING.
(Application filed July 16, 1900.)
(No Model.)
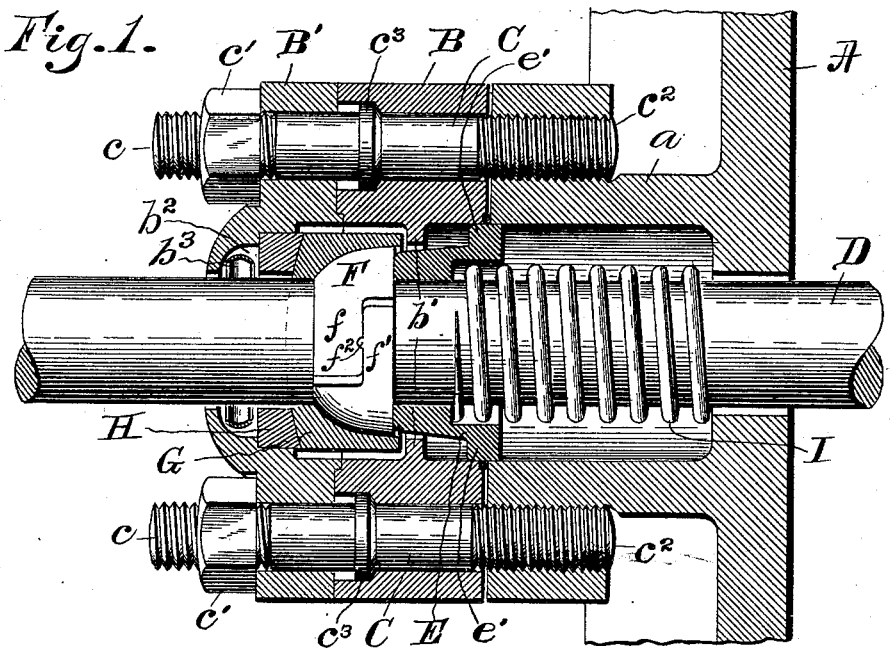
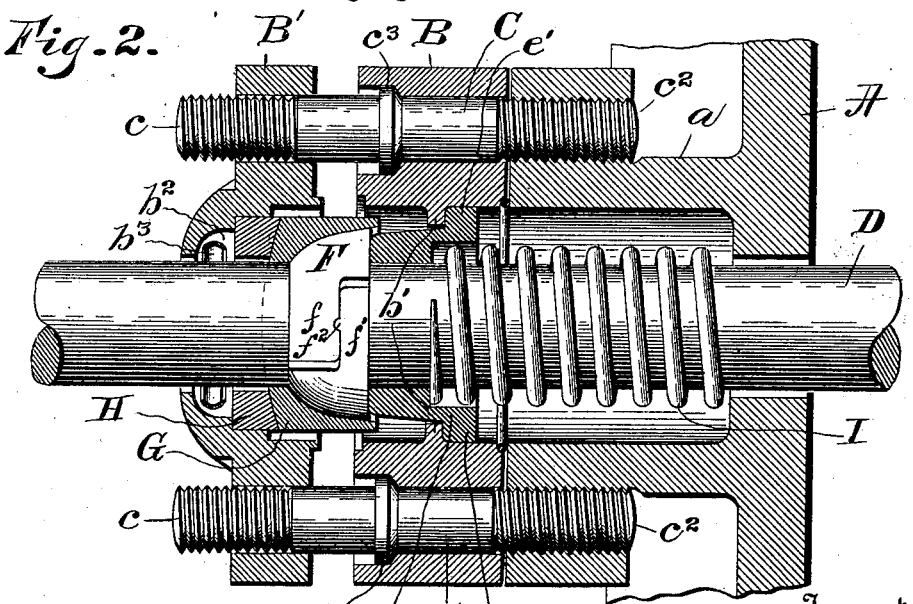
Witnesses
Marcus L. Byrne
Osgood H. Dowell
Inventor
Thomas G. Saxton
By Julian C. Dowell
Attorney

UNITED STATES PATENT OFFICE.

THOMAS GUNNI SAXTON, OF LEXINGTON, KENTUCKY, ASSIGNOR TO ROBERT E. McCUEN AND PHILIP J. GORMLEY, OF SAME PLACE.

METALLIC ROD-PACKING.

SPECIFICATION forming part of Letters Patent No. 671,681, dated April 9, 1901.

Application filed July 16, 1900. Serial No. 23,809. (No model.)

*To all whom it may concern:*

Be it known that I, THOMAS GUNNI SAXTON, a citizen of the United States, residing at Lexington, in the county of Fayette and State of Kentucky, have invented certain new and useful Improvements in Metallic Rod-Packing; and I do hereby declare the following to be a full, clear, and exact description of the invention, such as will enable others skilled in the art to which it appertains to make and use the same.

This invention relates to metallic rod-packing, and more particularly to metallic packing for piston-rods and valve-stems of steam or other engines.

In order to avoid the trouble and loss of time usually necessary in applying or removing metallic rod-packing by disconnecting the piston-rod or valve-stem from the cross-head or rocker-arm and inserting or withdrawing the packing by slipping it over the rod, metallic packing-rings have in some instances been constructed in a number of segments or sections which might be placed together about the rod within or covered by a suitable packing cup or receptacle and, together with the packing-cup, follower-ring, or other parts, inserted within the stuffing-box and secured therein by a gland or cover, a spiral spring within the stuffing-box serving the double purpose of compressing the packing within said cup and about the rod (so as to preserve a fluid-tight joint) and of forcing the packing, with its cup, follower-ring, and other parts, outwardly from the stuffing-box when the gland or cover is removed; but such constructions have in most cases proven objectionable on account of the difficulty of compressing the spring when the packing is being inserted within the stuffing-box and also the great force with which the packing and other parts are thrown from the stuffing-box when the gland or cover is removed, and, furthermore, metallic packing in many instances becomes defective after a small amount of use on account not only of the ordinary wear, but also the uneven wear and consequent leakage, due to the lateral movements or vibrations of the rod, and, further, because of the squeezing or wedging of the packing ring or segments within the packing-cup.

The primary objects of my invention are to provide a metallic rod-packing and gland of the above-described general construction, but with means for confining the action of the spring within proper limits, so as to overcome the difficulty above noted in inserting the packing within the stuffing-box and to prevent the packing proper and other parts from being pushed out or too forcibly from the stuffing-box when the gland or cover is removed therefrom, and, further, to improve generally the construction of the packing proper or packing-ring, packing-cup, and follower and vibration rings, so as to overcome the objections above noted, which are incident to the use of most of the devices of this character heretofore in use, and maintain a more effective and permanent sliding steam-joint under all conditions of service.

A further object of the invention is to provide a construction that may be applied to the ordinary stuffing-boxes in use on locomotive or other engines and to utilize, as far as practicable, the glands or other parts employed in metallic rod-packing.

The invention will first be hereinafter more particularly described with reference to the accompanying drawings, which form a part of this specification, and then pointed out in the claims at the end of the description.

In the drawings, in which corresponding parts are designated by like letters of reference, Figure 1 is a longitudinal elevation, principally in section, of a stuffing-box and portion of a piston-rod having a rod-packing and gland embodying my invention applied thereto; and Fig. 2 is a similar view showing the position of the parts when the gland-cap or follower-plate is removed from the gland.

The letter A in the drawings denotes a portion of a cylinder-head; $a$, an ordinary stuffing-box on the cylinder; B and B', divided portions of a gland or a gland proper and gland-cap or gland follower-plate, respectively, attached to the stuffing-box by means of bolts C C, which pass through suitable holes or eyes in the ears of the gland and gland cap or follower-plate and are tapped into interiorly-screw-threaded holes in the stuffing-box or ears thereon.

D is a piston-rod which passes through the stuffing-box and gland.

The gland proper, B, is interiorly provided with a projection, preferably in the form of an annular ridge or ledge $b'$, located about midway the length of the gland and which forms an abutment to limit the longitudinal play or movement in the direction of the cross-head of a follower-ring E on the piston-rod for a purpose which will be hereinafter explained. The gland follower-plate or part gland B' may be provided with an annular recess $b^2$ to receive a suitable lubricating swab or packing of soft material, which may be held in position and compressed about the rod by any suitable means, as by compression-spring or metallic ring $b^3$. While the gland B and gland follower-plate B' are preferably constructed as shown, other forms may be employed, and old glands, such as are in use on locomotives or other engines, may be utilized by dividing or cutting them into two parts and providing one part, as B, with a suitable interior projection or abutment, as the annular ledge $b'$, for limiting the longitudinal movement of the follower-ring, thus saving the expense incident to procuring new glands and gland caps or follower-plates.

The letter F denotes a packing-ring surrounding the rod and consisting of a number (preferably three) of similar or equal sections having the portions $f$ and $f'$ of adjoining sections overlapping when the sections of the ring are placed together about the rod. The contacting faces or edges of the portions $f$ and $f'$ may be smooth to adapt them to fit close together; but I preferably provide a slight elevation or ridge $f^2$ on one of the overlapping parts fitting a corresponding depression in the other with rounded or inclined surfaces, so as to properly center or distance the section of the ring about the rod and adapt the packing-ring or sections thereof to resist, at the line or junction between the straight and circular tapered portions or conical and spherical surfaces, any undue pressure of the spring or the steam acting on the ring E. The ring F is preferably tapered exteriorly, as shown in the drawings, on a straight line or cone-shaped to about the width of the segmental portion $f$ and thereafter on a curved line or substantially spherical to the front or about the front edge of the segment $f'$, and said ring F fits a similarly interiorly tapered bearing of a packing-cup G. By this construction a spherical or ball bearing is provided between the said ring and packing-cup, so that the packing may feed or move within the cup with the oscillations or vibrations of the rod without causing the usual squeezing and blurring noticed in many similar devices.

The packing-cup G abuts a suitable vibration-ring H, and instead of the usual straight or plane abutting surfaces the abutting or contacting surface of the cup G is preferably slightly convex or spherical and fits within a corresponding concave surface of the vibration-ring H, which arrangement permits the packing and cup to move freely with the lateral movements or vibrations of the piston-rod, thus overcoming the uneven wear of the packing-ring, cup, and vibration-ring or other parts, and consequent leakage due to such vibrations, and producing a more effective and permanent fluid-tight joint than in devices as hitherto constructed.

The packing-ring, cup, and vibration-ring are held in place against the action of a spring I within the stuffing-box by means of the gland cap or follower-plate B' abutting the vibration-ring H, the said cap or follower-plate being attached to the gland B' by the bolts C C, which secure the gland to the stuffing-box, said bolts passing through holes or eyes in the ears of the gland cap or follower-plate and having threaded ends $c\ c$ and lock-nuts $c'\ c'$ screwed thereon. The gland cap or follower-plate B' is preferably cylindrically recessed on its inner face around the piston-rod, and within this recess is fitted the vibration-ring H, which abuts against the packing-cup G, containing the packing ring or rings F, and holds the same against the spring I, so as to produce a fluid-tight and effective packing.

The packing ring or rings may be compressed within the cup and the ring, cup, and vibration-ring retained in position within the gland by means of a coiled or other suitable spring I, preferably surrounding the piston-rod, or other suitable expanding device interposed within the stuffing-box between the cylinder-head A and the follower-ring E on the piston-rod abutting the packing-ring. The said follower-ring E is adapted to travel longitudinally on the rod past the interior projection $b'$ or annular ledge of the gland B, but is preferably provided at its rearward end and at a suitable distance behind the said projection or ledge $b'$ with a lateral projection, which may be in the form of an annular ring or ledge $e'$, which cannot pass the aforesaid ledge $b'$, so that when the gland cap or follower-plate B' is removed from the gland proper, B, as in Fig. 2, the said projection or annular ledge $b'$ may form an abutment or stop to limit the longitudinal movement in the direction of the cross-head of the piston-rod and of the follower-ring E, and hence limit also the action of the spring I.

It will be apparent that the limit of movement of the ring E will be determined by the distance of the projection $e'$ from the annular ledge or projection $b'$, and the projection $e'$ may be placed a sufficient distance from the ledge $b'$ to allow the spring I, when the gland cap or follower-plate B' is removed, to push the packing-cup and packing just out of or beyond the face of the gland proper, B, so that access may be had thereto to remove or renew or otherwise attend to the packing.

In place of the projection $e'$ on the follower-ring E a separate ring of larger diameter and abutting the ring E might be employed; but the form herein shown is more convenient and requires a less number of parts.

To assemble the parts in operative position, the spring I is slipped over the piston-rod into the stuffing-box, then ring E, and thereupon the gland B is secured to the stuffing-box by means of the bolts C C, which may have threaded ends $c^2$ $c^2$, screwing into eyes or bolt-holes in the stuffing-box, and lateral projections or ribs $c^3$ $c^3$ between their ends occupying recesses in the face of the gland coincident with the eyes or bolt-holes in the gland. The sections of the packing-ring are then placed together about the rod, the packing-cup slipped over the rod and into place around the packing, followed by the vibration-ring H or other rings, if such are employed, and the gland-cap or gland follower-plate B', the latter being forced into place and secured to the gland B by the nuts $c'$ $c'$ on the ends of the bolts C C, thus compressing the spring I and causing the various parts to fit closely together, thereby producing an effectual fluid-tight joint.

Inasmuch as the expansive force of the spring I cannot push the follower-ring E beyond its projection $e'$, the gland cap or follower-plate B' may be placed on the bolts C C without liability of being pushed off by the action of the spring, as is the case in many other devices, and the nuts may then be applied to the bolts and the spring compressed, while the gland-cap is being screwed home, with very little difficulty, and when it is desired to have access to the packing to repair or remove and renew the same the fastening-nuts may be unscrewed from the bolts C C and the gland cap or follower-plate B' will be gradually pushed away from the gland B and the packing and packing-cup out from the gland while the nuts are being loosened without the annoyance of having the gland and the packing forced suddenly some distance from the gland, as is usual when the nuts are removed from the bolts of devices of this same general character as usually constructed. The nuts having been removed, the packing ring or sections may then be taken from the packing-cup and a new ring or sections placed therein and the parts reassembled with very little difficulty. Furthermore, as before observed, owing to my improved construction of packing-ring, cup, and vibration-rings, an effective and fluid-tight sliding joint is preserved under all conditions of use, and the objections noticed in many prior devices of leakage resultant on the uneven wear of the packing-ring and other parts on account of the lateral vibrations or oscillations of the piston and piston-rod and of squeezing and blurring of the packing and other parts are overcome. Moreover, the device is simple in design and inexpensive in construction and may be applied to the ordinary stuffing-boxes now in use on locomotive and other engines and also provides for the utilization of the glands and other parts employed for packing-rods on such engines.

Having thus described my invention, what I claim as new, and desire to secure by Letters Patent of the United States, is—

1. In a rod-packing, the combination with a suitably-chambered part, of a gland secured thereto and having an interior projection or stop, and a removable cap or cover; packing within said gland, a follower-ring and an expansible device coöperating therewith for compressing the packing; said follower-ring having an exterior projection adapted to contact with said stop and thereby limit the outward movement of the ring when the gland cap or cover is removed; substantially as described.

2. In a rod-packing, the combination of a stuffing-box, a gland secured thereto having a removable end portion and an interior projection, suitable packing within said gland and means for compressing the same, comprising a spring and a follower-ring having a lateral projection adapted to abut the projection on the interior of the gland, when the end portion of the gland is removed, so as to limit the outward movement of the follower-ring and packing on the rod; substantially as described.

3. The combination of a cylinder-head or steam-chest having a stuffing-box thereon, a gland secured thereto having an interior projection, a gland cap or follower-plate removably secured to the gland, a packing-cup within the gland, a packing ring or rings within said cup, a spring adjacent to the cylinder-head or steam-chest, and a ring interposed between said spring and packing having a part adapted to contact with the interior projection of the gland so as to limit the action of the spring when the gland cap or follower-plate is removed; substantially as described.

4. A packing-ring composed of a plurality of sections, each consisting of a segmental or parti-cylindric portion having an integral part overlapping a part of another portion, the contacting faces of said parts having a corresponding lug-and-notch engagement, said sections being exteriorly tapered, and having a conical surface a portion of its width, and a substantially spherical surface the remainder thereof, substantially as described.

5. In a rod-packing, the combination of a stuffing-box, rod and gland, a packing-cup within the gland having a packing-ring therein, said gland having an interior projection, and an outer ring abutting said cup, the abutting surfaces of the packing-cup and outer ring being convex and concave respectively, a follower-ring adapted to engage the interior projection of the gland, and means for compressing the packing-ring within the packing-cup and forcing said cup against the outer ring, substantially as described.

6. In a rod-packing, the combination with the stuffing-box and rod, of a gland secured to the stuffing-box and having an interior projection, a packing-cup within the gland and suitable packing within the cup, an outer ring abutting the packing-cup, a gland follower-plate removably secured to the gland and against which said outer ring is seated, a spring within the stuffing-box adapted to normally compress the packing and through the same force the packing against said outer ring, and to force the packing out of the gland-chamber when the gland follower-plate is removed, together with means interposed between the said spring and packing to engage the aforesaid interior projection of the gland and limit the outward movement of the parts coöperatively therewith; substantially as described.

7. In combination with the gland proper interiorly chambered to form a housing for the packing, the detachable outer section similarly interiorly chambered to form a continuation of the chambered portion of the main section, and means for securing said parts together and to a stuffing-box; said detachable section having an annular recess back of said chambered portion shouldered to form a seat for a ring abutting the packing-cup and leaving an annular recess back of said seat to form a packing-receptacle; substantially as described.

8. In a rod-packing, the combination with a stuffing-box and gland therefor, of a packing, devices for holding the packing in place, means exerting an outward pressure on said packing, and means for limiting the extent to which the packing is moved outwardly on the removal of such pressure, substantially as described.

9. In a rod-packing, the combination with a stuffing-box, a gland therefor, and a removable cap or cover for said gland, of a packing within the gland, devices for holding the packing in place, means exerting an outward pressure on said packing, and means for limiting the extent to which the packing is moved outwardly on the removal of said cap or cover, substantially as described.

10. In a rod-packing, the combination of the stuffing-box, a gland therefor having an interior stop or projection, a packing within the gland, devices for holding the packing in place, a follower-ring, and an expansible device coöperating therewith for compressing the packing, said follower-ring having a projection adapted to contact with said stop, substantially as shown and in the manner described.

In testimony whereof I affix my signature in presence of two witnesses.

THOMAS GUNNI SAXTON.

Witnesses:
J. J. WOOD,
G. J. BYRD.